(12) United States Patent
Sawaki

(10) Patent No.: US 8,300,158 B2
(45) Date of Patent: Oct. 30, 2012

(54) POLARIZATION ELEMENT AND PROJECTOR

(75) Inventor: Daisuke Sawaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 13/005,242

(22) Filed: Jan. 12, 2011

(65) Prior Publication Data

US 2011/0205458 A1   Aug. 25, 2011

(30) Foreign Application Priority Data

Feb. 19, 2010  (JP) ................. 2010-034376

(51) Int. Cl.
*G02F 1/1335* (2006.01)
(52) U.S. Cl. ............................. 349/5; 349/96
(58) Field of Classification Search .......... None
See application file for complete search history.

(56) References Cited

U.S. PATENT DOCUMENTS

| | | | | |
|---|---|---|---|---|
| 7,046,441 B2 * | 5/2006 | Huang et al. | ............ | 359/485.05 |
| 7,233,563 B2 | 6/2007 | Ueki et al. | | |
| 7,722,194 B2 | 5/2010 | Amako et al. | | |
| 7,755,718 B2 | 7/2010 | Amako et al. | | |
| 2008/0304004 A1 | 12/2008 | Amako et al. | | |
| 2010/0188747 A1 | 7/2010 | Amako et al. | | |
| 2010/0238555 A1 | 9/2010 | Amako et al. | | |
| 2011/0115991 A1 | 5/2011 | Sawaki | | |

FOREIGN PATENT DOCUMENTS

| | | |
|---|---|---|
| JP | A-2005-37900 | 2/2005 |
| JP | A-2006-133275 | 5/2006 |
| JP | A-2009-15302 | 1/2009 |
| JP | A-2009-15305 | 1/2009 |
| JP | A-2009-64005 | 3/2009 |
| JP | A-2010-101965 | 5/2010 |

* cited by examiner

*Primary Examiner* — Richard Kim
(74) *Attorney, Agent, or Firm* — Oliff & Berridge, PLC

(57) ABSTRACT

A polarization element includes: a substrate; and a plurality of grid sections arranged on the substrate, wherein the grid sections each have protruding sections and recessed sections alternately arranged in a longitudinal direction of the grid sections at a pitch shorter than a wavelength of incident light, and an arrangement pitch of the protruding sections is different between the grid sections adjacent to each other.

7 Claims, 9 Drawing Sheets

POLARIZATION ELEMENT AND PROJECTOR

BACKGROUND

1. Technical Field

The present invention relates to a polarization element and a projector.

2. Related Art

Recent years, wire grid polarization elements have been known as optical elements having a polarization separation function. The wire grid polarization elements are each obtained by forming a nanoscale wire section (thin metal wires) on a light transmissive substrate such as a glass substrate so as to line the substrate with the wire section. The wire grid polarization elements have a characteristic of having a high polarization separation performance, and in addition, being superior in heat resistance to polarization elements made of organic materials since the wire grid polarization elements are made of inorganic materials. Therefore, use of wire grid polarization elements instead of polarization separation elements made of polymeric materials in the related art is considered in various optical systems. Specifically, the wire grid polarization elements are preferably used as polarization elements for light valves of liquid crystal projectors exposed to the light from high power light sources, and are disposed in front of and behind (at lest either one of the light entrance side and the light exit side) the light valves.

Incidentally, on the light exit side of the light valve, the function of absorbing the unwanted polarized light is required. This is because, if the unwanted polarized light is reflected on the light exit side of the light valve, there might arise a problem that the reflected light enters the light valve again to cause temperature rise in transistors, which makes the grayscales out of order, or to become stray light, which degrades the image quality.

Therefore, there has been considered various types of wire grid polarization elements of an absorption type provided with a function of absorbing the unwanted polarized light. For example, in JP-A-2005-37900 (Document 1), the unwanted polarized light is selectively absorbed by a polarization element having a first grating layer with light reflecting property formed on a substrate attached with a second grating layer (an absorbing layer) with a light absorbing property.

On the other hand, in JP-A-2006-133275 (Document 2), there is proposed a polarization element having a light transmissive substrate having steps formed on the surface with a pitch longer than the wavelength of the incident light, and light reflecting bodies arranged on the surface of the light transmissive substrate in a striped manner with a pitch shorter than the wavelength of the incident light. Thus, the stray light is prevented from occurring by reflecting the unwanted polarized light component with an angle but not specularly.

However, in Document 1, since deposition of the absorbing layer is required in addition to formation of the polarization element, and therefore, the structure of the element becomes complicated to thereby raise the manufacturing cost.

SUMMARY

An advantage of some aspects of the invention is to provide a polarization element and a projector capable of selectively absorbing unwanted polarized light to thereby be superior in grayscale expression, realize high-quality image display, and further simplify the element structure to achieve cost reduction.

A polarization element according to an aspect of the invention includes a substrate, and a plurality of grid sections arranged on the substrate, wherein the grid sections each have protruding sections and recessed sections alternately arranged in a longitudinal direction of the grid sections at a pitch shorter than a wavelength of incident light, and an arrangement pitch of the protruding sections is different between the grid sections adjacent to each other.

According to this configuration, by adopting the resonant grating structure having the protruding sections arranged on the thin metal wires at a pitch shorter than the wavelength of the incident light, it becomes possible to develop the surface plasmon resonance (SPR) to thereby selectively absorb the linearly polarized light TE (unwanted polarized light) with a specific wavelength entering the polarization element. Specifically, when the linearly polarized light TE enters the resonant grating structure described above, the evanescent light is generated. The wave number thereof and the wave number of the surface plasmon can be made equal to each other using the evanescent light, and thus the surface plasmon can be excited. Since the energy of the incident light is consumed for the excitation of the surface plasmon, the reflection toward the entering direction of the light can be reduced. Therefore, it becomes possible to provide the polarization element capable of selectively absorbing unwanted polarized light to thereby be superior in grayscale expression, and realize high-quality image display. Further, since it is not required to provide the absorbing layer, which is provided in the case of Document 1, it becomes possible to simplify the element structure to thereby achieve cost reduction.

Further, since in this aspect of the invention, the arrangement pitch of the protruding sections is different between the grid sections adjacent to each other, the wavelength of the linearly polarized light TE which can be absorbed is different between the grid sections, and as a result, the wavelength range of the linearly polarized light which can be absorbed is dramatically expanded. Therefore, since the reflectance can be decreased in a broad wavelength range, the design margin thereof increases when applying the polarization element to the projectors, and a more user-friendly polarization element can be obtained.

Further, in the polarization element of the above aspect of the invention, it is preferable that the protruding sections and the recessed sections provided to the same grid section have lengths equal to each other.

According to this configuration, since the lengths of the protruding sections and the recessed sections provided to the same grid section are arranged to be equal to each other, the manufacturing thereof becomes easy. Further, since it becomes easy for the surface plasmon to be excited in every grid section, the energy of the incident light is consumed, and the reflection toward the entering direction of the light can sufficiently be reduced.

Further, in the polarization element of the above aspect of the invention, it is preferable that a plurality of grid groups each having first one of the grid sections having the protruding sections arranged at a first pitch and second one of the grid sections having the protruding sections arranged at a second pitch is disposed on the substrate, and a width of the grid group in an arrangement direction of the grid sections is smaller than the wavelength of the incident light.

According to the configuration described above, it becomes possible to make the wavelength range of the linearly polarized light, which can be absorbed, be different between the grid sections adjacent to each other. Further, it becomes possible to set the arrangement pitch of the protruding sections in accordance with the incident light. Further, by previously determining several arrangement pitches of the protruding sections, the element design becomes easy, and the manufacturing thereof also becomes easy.

Further, in the polarization element of the above aspect of the invention, it is preferable that a plurality of types of grid sections having arrangement pitches of the protruding sections different from each other is arranged irregularly on the substrate.

According to this configuration, by appropriately performing the design of irregularly arranging the plurality of types of grid sections with the arrangement pitches of the protruding sections different from each other on the substrate, it is possible to obtain the polarization element having a preferable optical characteristic.

Further, in the polarization element of the above aspect of the invention, it is preferable that a protrusion height of the protruding sections with respect to the recessed sections is different between the grid sections adjacent to each other.

According to this configuration, since the protrusion height of the protruding sections with respect to the recessed sections is different between the grid sections adjacent to each other, the polarization element having a preferable optical characteristic can be obtained.

Further, in the polarization element of the above aspect of the invention, it is also possible that the grid sections, the protruding sections, and the recessed sections each have a rectangular shape in a side view.

According to this configuration, the grid sections, the protruding sections, and the recessed sections each have a rectangular side-view shape, and are therefore, easy to manufacture. Specifically, these constituents can easily be manufactured by forming the metal film on the substrate, and then performing anisotropic etching of reactive ion etching (RIE) thereon using the resist pattern as a mask. Therefore, it becomes possible to improve the production efficiency to thereby achieve the cost reduction.

According to another aspect of the invention, there is provided a projector including a lighting optical system adapted to emit a light beam, at least one liquid crystal light valve adapted to modulate the light beam, at least one polarization element according to the aspect of the invention described above, to which the light beam modulated by the liquid crystal light valve is input, and a projection optical system adapted to project a polarized light beam, which is transmitted through the polarization element, to a projection surface.

According to this configuration, since the polarization element related to the above aspect of the invention is provided, the deterioration of the polarization element can be prevented even in the case of using a high-power light source. Therefore, there can be provided the projector superior in grayscale expression, capable of realizing high-quality image display, and achieving cost reduction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
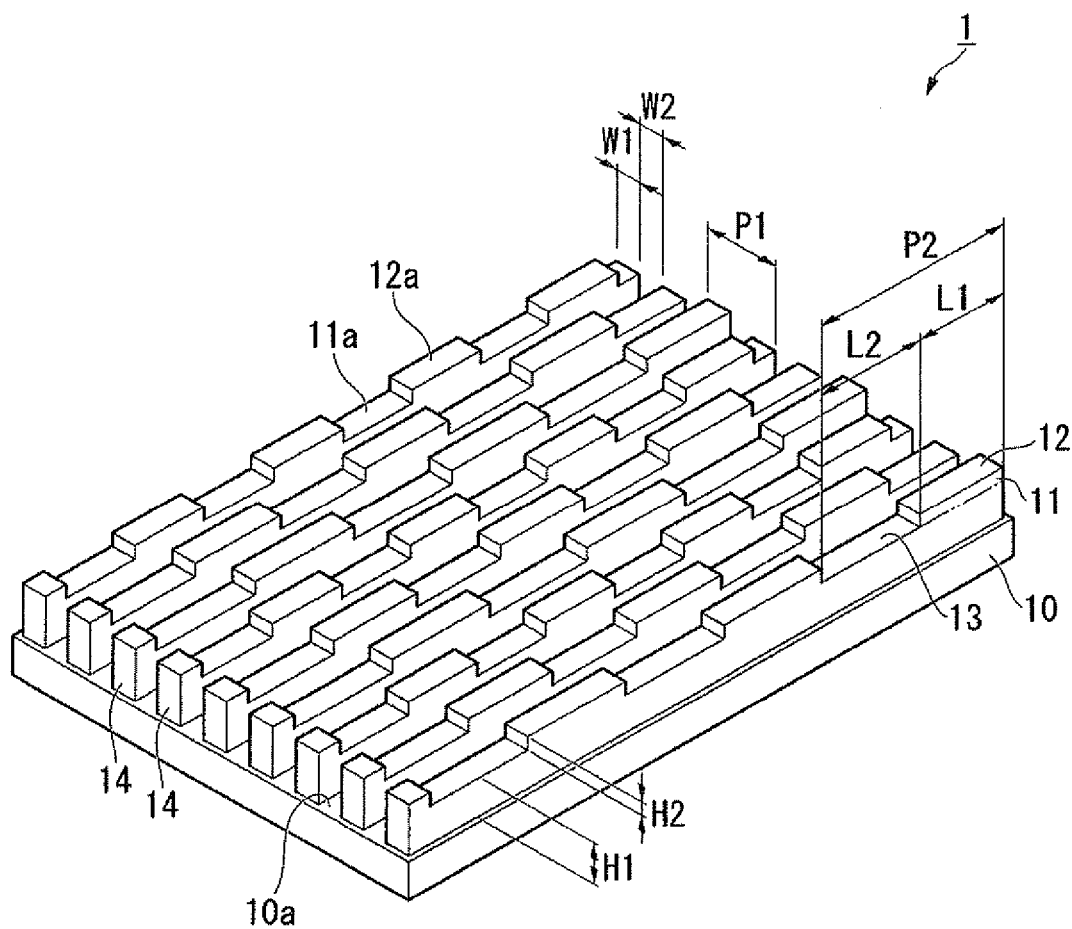
FIG. 1 is a perspective view showing a schematic configuration of a polarization element according to a first embodiment of the invention.

Hereinafter, an embodiment of the invention will be described with reference to the accompanying drawings. The embodiment shows an aspect of the invention, but does not limit the scope of the invention, and can arbitrarily be modified within the scope of the invention. Further, in the drawings explained hereinafter, in order for making each constituent easy to understand, the actual structures and the structures of the drawings are different from each other in scale size, number, and so on.

It should be noted that in the following explanations, an XYZ coordinate system is assumed, and positional relationships between the respective members will be explained with reference to the XYZ coordinate system. On this occasion, it is assumed that a predetermined direction in a horizontal plane is an X-axis direction, a direction perpendicular to the X-axis direction in the horizontal plane is a Y-axis direction, and a direction perpendicular to both of the X-axis direction and the Y-axis direction is a Z-axis direction.

Polarization Element of First Embodiment

Figure 2A:
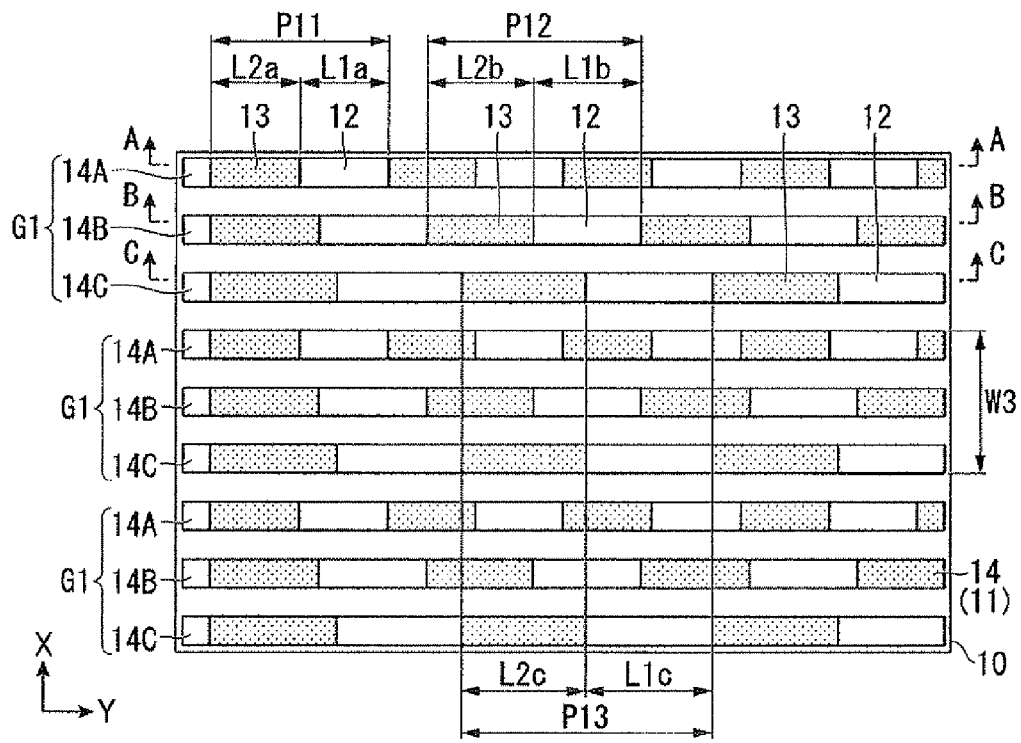
FIG. 2A is a plan view showing a schematic configuration of the polarization element.
Figure 2B:
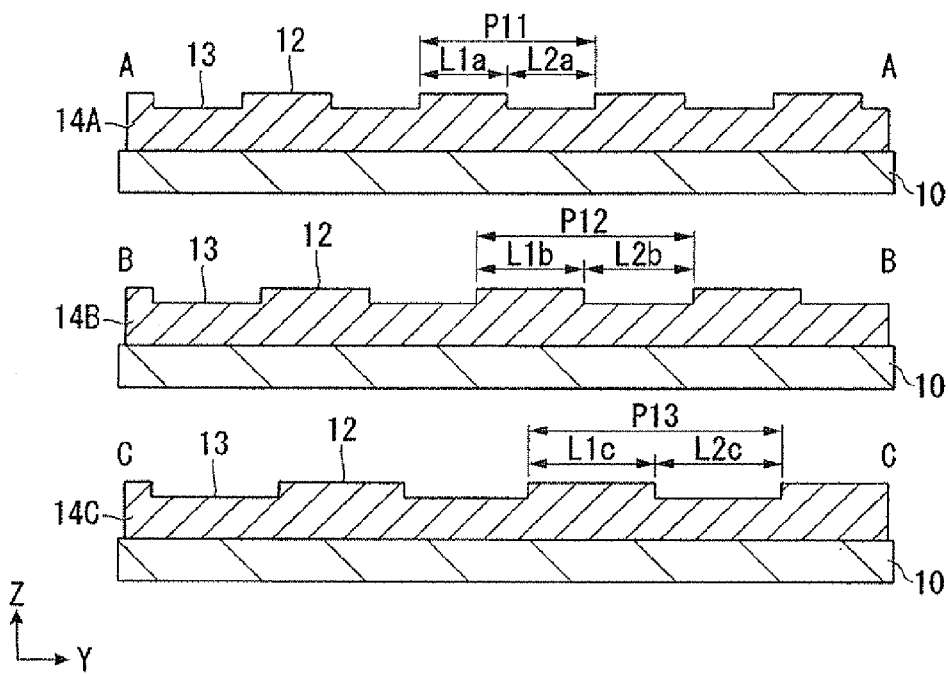
FIG. 2B is a partial cross-sectional view showing a schematic configuration of the polarization element.

FIG. 1 is a perspective view showing a schematic configuration of a polarization element according to a first embodiment of the invention. FIG. 2A is a plan view showing a schematic configuration of the polarization element, and FIG. 2B is a partial cross-sectional view showing a schematic configuration of the polarization element. In FIGS. 1, 2A, and 2B, the reference symbol P1 denotes the pitch of the thin metal wires, the reference symbols P11, P12, and P13 denote the pitches of respective protruding sections, the reference symbol H1 denotes the height of each of the thin metal wires, and the reference symbol H2 denotes the height of each of the protruding sections. Further, it is assumed that an extending direction of the thin metal wires is the Y-axis direction, and the arranging axis of the thin metal wires is the X-axis direction.

As shown in FIG. 1, the polarization element 1 has a structure of absorbing the unwanted polarized light using a surface plasmon resonance (SPR). The polarization element 1 has a configuration having a plurality of grid sections 14 arranged on a substrate 10. It should be noted that details of the SPR will be described later.

As the constituent material of the substrate 10, the material having a light transmissive property and high heat resistance such as glass or quartz is used. In the present embodiment, glass substrate is used as the substrate 10.

The plurality of grid sections 14 is arranged in a direction (the X-axis direction) parallel to the plane of the substrate 10 at a pitch P1 shorter than the wavelength of the light, and forms a striped shape (a plan-view striped shape) in which the extending directions of the respective grid sections are parallel to each other when viewed from a direction (the Z-axis direction) perpendicular to the plane of the substrate 10.

The grid sections 14 are each composed of a thin metal wire 11 formed on the substrate 10, and a plurality of protruding sections 12 and recessed sections 13 formed on the thin metal wire 11, and the protruding sections 12 and the recessed sections 13 are arranged at intervals in the longitudinal direction of the thin metal wire 11.

The thin metal wires 11 are each formed on the upper surface 10a of the substrate 10 in the longitudinal direction (the Y-axis direction) with a length sufficiently longer than the wavelength of the light and a predetermined height H1. The thin metal wires 11, the protruding sections 12, and the recessed sections 13 each have a rectangular shape viewed from at least the X-axis direction.

The thin metal wires 11 are set to have the pitch P1 of about 140 nm, and the height H1 of about 150 nm, for example. The height H1 of the thin metal wires 11 denotes the distance from the upper surface 10a of the substrate to the upper surface 11a of each of the thin metal wires 11. The pitch P1 of the thin metal wires 11 is equal to the sum of the width W1 of the thin metal wire 11 in the X-axis direction and the width W2 of a space between the thin metal wires 11 adjacent to each other.

Further, the ratio between the width W1 of the thin metal wire 11 in the X-axis direction and the width W2 of the space between the thin metal wires 11 is set to approximately 1:1.

The protruding sections 12 and the recessed sections 13 are arranged on the upper surface 11a of the thin metal wire 11 at a predetermined pitch, and are formed to have a predetermined height H2 and a predetermined depth, respectively. The height H2 of the protruding sections 12 with respect to the recessed sections 13 is set to be smaller than the height H1 of the thin metal wires 11 (H2<H1). The height H2 of the protruding sections 12 denotes the distance from the upper surface 11a of each of the thin metal wires 11 to the upper surface 12a of each of the protruding sections 12, and is equal to the depth of the recessed sections 13. In the present embodiment, the height H2 (i.e., the depth of the recessed sections 13) of the protruding sections 12 is set to about 25 nm.

Further, the protruding sections 12 are each formed to have a rectangular side-view shape and a rectangular plan-view shape, and are arranged in the longitudinal direction (the Y-axis direction) of the thin metal wires 11 at a pitch shorter than the wavelength of the light.

Further, the length L1 of each of the protruding sections 12 formed on the thin metal wire 11 and the length L2 of each of the recessed sections 13 formed on the same thin metal wire 11 are equal to each other, and a plurality of protruding sections 12 and a plurality of recessed sections 13 are arranged in a predetermined pitch in the longitudinal direction (the Y-axis direction) of the thin metal wire 11.

On the other hand, the lengths of each the protruding sections 12 and each of the recessed sections 13 formed on one of the thin metal wires 11 are different from the respective lengths of those formed on the adjacent thin metal wire 11. In conjunction therewith, the arrangement pitch of the protruding sections 12 (the recessed sections 13) is different between the thin metal wires 11 adjacent to each other.

In other words, the length L1 of the protruding section 12 in the longitudinal direction of the thin metal wire 11 and the length of the recessed section 13 formed between the two protruding sections 12 adjacent to each other in the longitudinal direction of the thin metal wire 11 are different between the grid sections 14 (14A, 14B, and 14C) adjacent to each other as shown in FIG. 2A.

Specifically, as shown in FIGS. 2A and 2B, the length L1a of the protruding section 12 (the length L2a of the recessed section 13) of the grid section 14A, the length L1b of the protruding section 12 (the length L2b of the recessed section 13) of the grid section 14B, and the length L1c of the protruding section 12 (the length L2c of the recessed section 13) of the grid section 14C are different from each other, and satisfy a relationship of L1a<L1b<L1c (L2a<L2b<L2c).

In the present embodiment, a grid group G1 is composed of the three grid sections 14A, 14B, and 14C having the respective arrangement pitches of the protruding sections 12 and the recessed sections 13 on the thin metal wires 11 different from each other. Specifically, a plurality of protruding sections 12A (recessed sections 13A) disposed on the thin metal wire 11A is arranged at a first pitch P11, a plurality of protruding sections 12B (recessed sections 13B) disposed on the thin metal wire 11B is arranged at a second pitch P12, and a plurality of protruding sections 12C (recessed sections 13C) disposed on the thin metal wire 11C is arranged at a third pitch P13.

Here, the first pitch P11 is set to 450 nm, the second pitch P12 is set to 500 nm, and the third pitch P13 is set to 550 nm.

It should be noted that each of the pitches P11, P12, and P13 is a sum of the length L1 of the protruding section 12 formed on the thin metal wire 11 in the Y-axis direction and the length L2 of the recessed section 13 between the protruding sections 12 adjacent to each other.

Further, the width W3 (the distance between the outer end portions of the respective grid sections 14A, 14C disposed on both sides of the grid section 14B so as to sandwich the grid section 14B) of the grid group G1 in the arrangement direction of the grid sections 14A, 14B, and 14C is set to be smaller than the wavelength of the incident light.

The polarization element 1 according to the present embodiment is configured by disposing a plurality of such grid groups G1 on the substrate 10. The interval between the grid groups G1 is equal to the width W2 (FIG. 1) of the space between the thin metal wires 11.

As described above, by making the arrangement pitches of the protruding sections 12 (the recessed sections 13) on the thin metal wires 11 adjacent to each other different from each other, setting the height of the thin metal wires 11 to H1, and setting the height of the protruding section 12 to H2, it is possible to form the element structure for developing the SPR.

Although in the present embodiment the grid section 14A, the grid section 14B, and the grid section 14C are arranged in this order, in the ascending order of the length of the protruding sections 12 and the recessed sections 13, it is not necessary to arrange them in the order of the length of the protruding sections 12 and the recessed sections 13 providing the length of the protruding sections 12 and the recessed sections 13 is different between the grid sections 14 adjacent to each other.

As the constituent material of the thin metal wires and the protruding sections 12, aluminum (Al), gold (Au), silver (Ag), copper (Cu), molybdenum (Mo), and chromium (Cr), and alloys of any of these metals, for example, can be used. In the present embodiment, Al is used as the constituent material of both of the thin metal wires 11 and the protruding sections 12.

As described above, by using glass as the constituent material of the substrate 10, and Al as the constituent material of the thin metal wires 11 and the protruding section 12, the heat resistance of the polarization element 1 as a whole can be improved.

Figure 3:
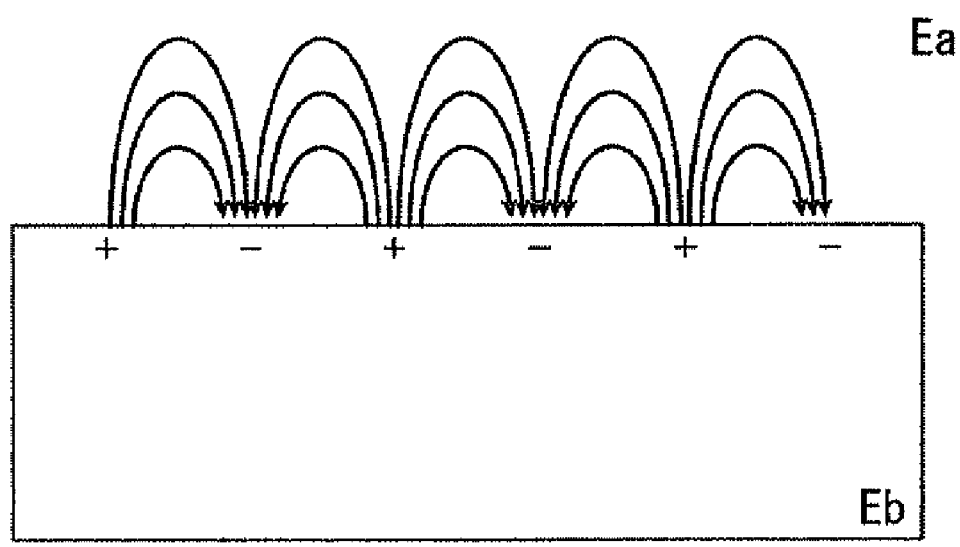
FIG. 3 is a diagram showing a mechanism of the electrical field enhancement by the SPR.

Here, the SPR will be explained with reference to FIG. 3. FIG. 3 is a diagram showing a mechanism of the electrical field enhancement by the SPR. As shown in FIG. 3, the interface between the metal (with a dielectric constant Eb) and the dielectric material (with a dielectric constant Ea) such as air is considered.

Free electrons exist in the metal, and when the light enters the surface of the metal from the side of the dielectric material, a compressional wave (a surface plasmon) of the free electrons can be excited in a certain condition. In this condition, the energy of the light entering the surface of the metal is consumed for the excitation of the surface plasmon. As a result, the energy of the light reflected by the surface of the metal is reduced.

When making the light propagating through air enter a flat metal surface, no surface plasmon can be excited. This is because, in either of the incident angles, the wave number in the interface direction the incident light has becomes smaller than the wave number of the surface plasmon, but is not equal thereto. There is known a method of using a diffraction grating on a metal surface in order for exciting the surface plasmon. This is because, specifically, when making the light enter the diffraction grating, the wave number of the evanescent wave generated is obtained by adding the wave number of the diffraction grating to the wave number of the incident light, and therefore, can be made equal to or larger than the wave number of the surface plasmon. It should be noted that the surface plasmon is a compressional wave of the electrons in the interface direction. Therefore, only the polarized light component with the polarization perpendicular to the diffraction grating can excite the surface plasmon.

Figure 4A:
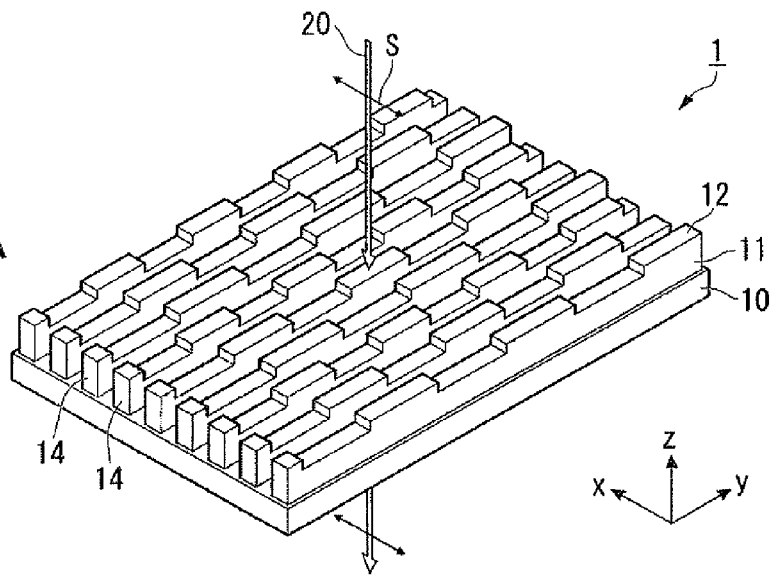
FIGS. 4A and 4B are schematic diagrams showing polarization separation of the light entering the polarization element.
Figure 4B:
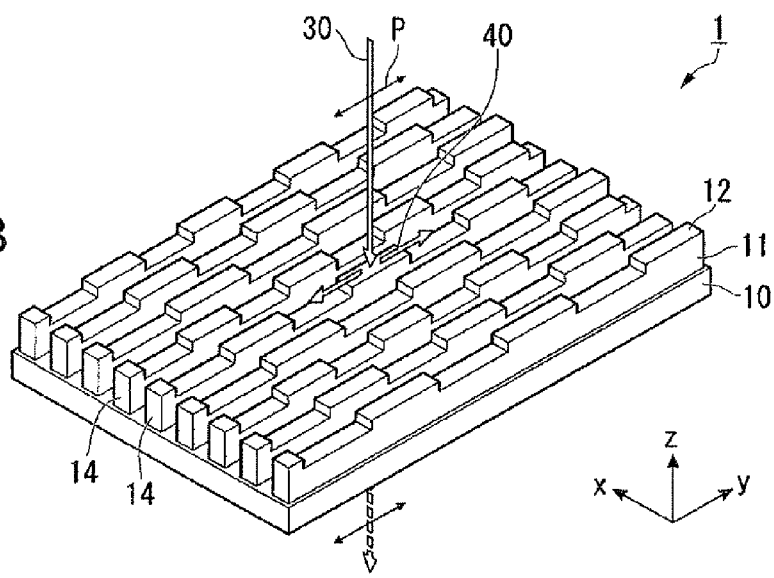
Figure 5A:
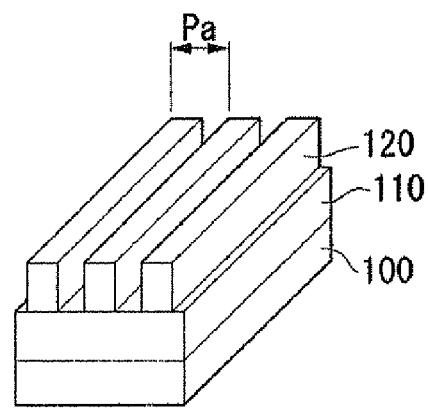
FIGS. 5A through 5E are diagrams showing a manufacturing process of the polarization element according to the first embodiment of the invention.
Figure 5B:
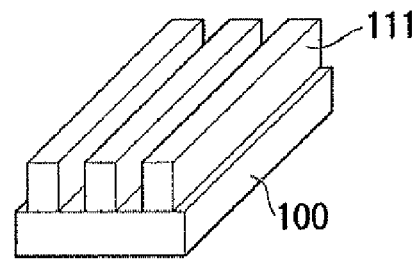
Figure 5C:
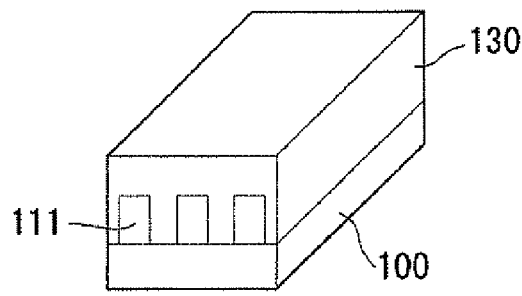
Figure 5D:
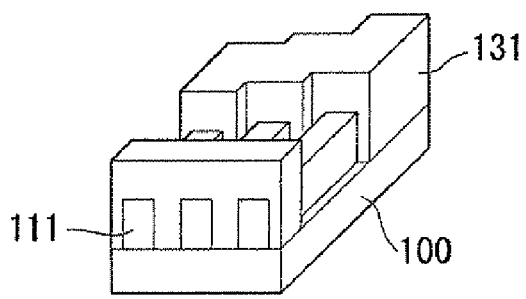
Figure 5E:
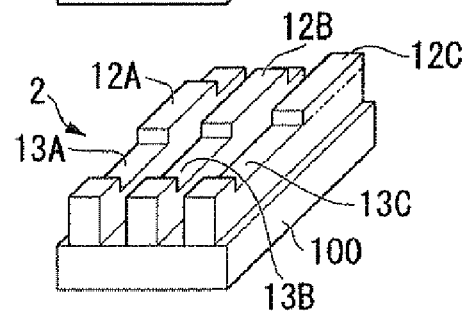

FIGS. 4A and 4B are schematic diagrams showing polarization separation of the light entering the polarization element 1. FIG. 4A shows the case in which the linearly polarized light TM (transverse magnetic) vibrating in a direction perpendicular to the longitudinal direction of the thin metal wires 11 enters the polarization element 1. FIG. 4B shows the case in which the linearly polarized light TE (transverse electric) vibrating in the longitudinal direction of the thin metal wires 11 enters the polarization element 1.

As shown in FIG. 4A, the incident light 20 to the polarization element 1 has a component "s" (a TM polarized component) having a polarization axis perpendicular to the longitudinal direction (the Y-axis direction) of each of the thin metal wires 11. Therefore, the polarization axis "s" of the incident light 20 becomes parallel to a resonant grating. Therefore, according to the principle described above, the evanescent wave is not generated, and no surface plasmon can be excited.

Therefore, in the case in which the linearly polarized light TM enters the polarization element 1, the surface plasmon resonance does not develop. In other words, the polarization element 1 performs only the polarization separation function on the incident light 20. Therefore, as a result, the most part of the incident light 20 is transmitted through the polarization element 1.

As shown in FIG. 4B, the incident light 30 to the polarization element 1 has a component "p" (a TE polarized component) having a polarization axis parallel to the longitudinal direction (the Y-axis direction) of each of the thin metal wires 11. Therefore, the polarization axis "p" of the incident light 30 becomes perpendicular to the resonant grating. Therefore, according to the principle described above, the surface plasmon 40 can be excited.

Therefore, in the case in which the linearly polarized light TE enters the polarization element 1, the surface plasmon resonance develops. Therefore, the energy of the incident light 30 is consumed for the excitation of the surface plasmon 40. Although under ordinary circumstances the polarization separation function is performed on the incident light 30 having the polarization axis "p" to reflect the most of the incident light 30, the energy of the incident light 30 is consumed for the excitation of the surface plasmon 40 in the structure according to the invention. Thus, as a result, the reflected light is reduced. In other words, by developing the surface plasmon resonance (SPR), the linearly polarized light TE entering the polarization element 1 can selectively be absorbed.

As described above, according to the invention, there is adopted the configuration in which the thin metal wires 11 are formed on the upper surface of the substrate 10, and the protruding sections 12 are formed on the upper surface 11a of each of the thin metal wires 11 in the longitudinal direction of the thin metal wires 11 at a pitch P2 shorter than the wavelength of the light, thereby developing the SPR. Thus, it becomes possible to selectively absorb the linearly polarized light TE (unwanted polarized light) without providing the absorbing layer as provided in the case of Document 1.

FIGS. 5A through 5E are diagrams showing a manufacturing process of the polarization element. Firstly, an Al film 110 is formed on the glass substrate 100 by a method such as evaporation or sputtering. Subsequently, photoresist is applied on the Al film 110 by a method such as spin-coating, and a resist pattern 120 is formed (see FIG. 5A) by a method such as two-beam interference exposure. On this occasion, the resist pattern 120 is formed so as to have a pitch Pa (corresponding to the pitch of the thin metal wires) of about 140 nm. It should be noted that the method of forming the resist pattern 120 is not limited thereto. A transfer process such as nanoimprint can also be used.

Subsequently, using the resist pattern 120 as a mask, reactive ion etching (RIE) with a chlorine-based gas is performed. Thus, anisotropic etching is performed on the Al film 110 until the upper surface of the glass substrate 100 is exposed. Subsequently, the resist pattern 120 is removed, thereby forming (see FIG. 5B) the thin metal wires 111.

Subsequently, photoresist 130 is applied (see FIG. 5C) to the surface of the glass substrate 100 provided with the thin metal wires 111 by a method such as spin-coating. Subsequently, a resist pattern 131 with a pitch Pb (corresponding to the pitch of the protruding sections) of about 500 nm is formed (see FIG. 5D) by a method such as photolithography.

Subsequently, using the resist pattern 131 as a mask, etching (RIE) is performed selectively on the areas where the thin metal wires 111 are exposed. The amount of etching of the thin metal wires 111 is controlled by the etching time. Subsequently, by removing the resist pattern 131, the protruding sections 12A, 12B, and 12C are formed at the portions having been covered by the resist pattern 131 while the recessed sections 13A, 13B, and 13C are formed at the portions on which the etching is performed (see FIG. 5E). The polarization element 1 according to the present embodiment of the invention can be manufactured by the process described above.

According to the polarization element 1 of the embodiment of the invention, by adopting the resonant grating structure in which the protruding sections 12 and the recessed sections 13 are arranged on the upper surface 11a of each of the thin metal wires 11 at the pitch P2 shorter than the wavelength of the incident light, and the arrangement pitch of the protruding sections 12 (the recessed sections 13) in the longitudinal direction of the thin metal wires 11 is different between the thin metal wires 11 adjacent to each other, it becomes possible to develop the surface plasmon resonance (SPR) to thereby selectively absorb the linearly polarized light TE (the unwanted polarized light) with a predetermined wavelength entering the polarization element 1, and at the same time enlarge the range of the wavelength of the polarized light which can be absorbed.

Figure 6:
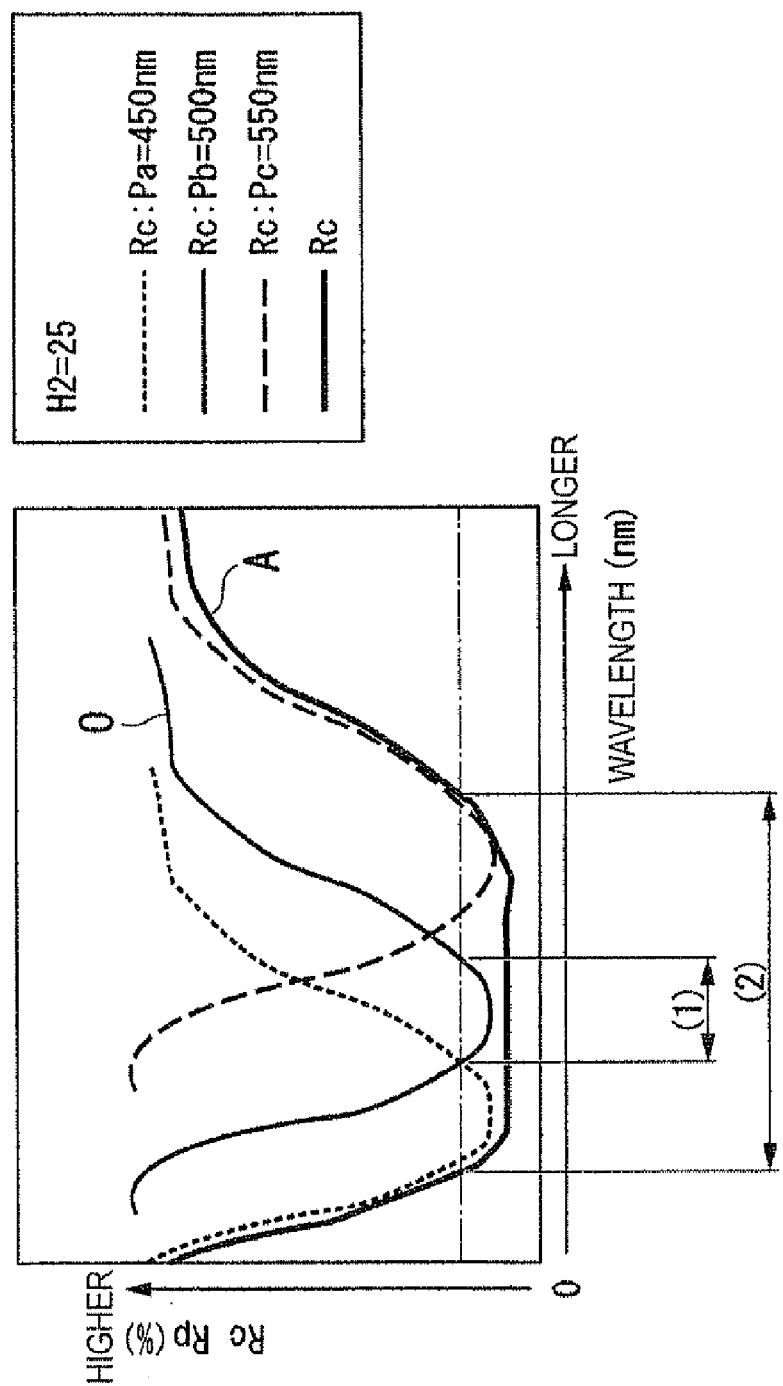
FIG. 6 is a graph showing the reflection characteristic of the first embodiment.

Specifically, the reflectance curve of the polarization element 1 according to the present embodiment becomes to have the shape schematically shown in FIG. 6. FIG. 6 shows the reflection characteristic of the polarization element according to the present embodiment. In the drawing, the lateral axis represents the wavelength of the incident light, and the vertical axis represents the reflectance (Rc) with respect to the TE light.

FIG. 6 shows the reflection characteristics in three types of resonant grating (the arrangement pitch Pa is 450 nm, the arrangement pitch Pb is 500 nm, and the arrangement pitch Pc is 550 nm) having the depth (the height of the protruding sections 12) of the resonant grating of 25 nm and arrangement pitches of the protruding sections 12 different from each other.

In each of the resonant grating with respective arrangement pitches Pa, Pb, and Pc different from each other, a significant decrease in reflectance is observed in the reflectance (Rc) to the TE light around a predetermined wavelength. It is conceivable that this decrease in the reflectance is caused by the consumption of the energy of the incident light for the excitation of the surface plasmon.

Further, according to FIG. 6, it is understood that the wavelength band where the reflectance (Rc) to the TE light becomes lower than a reference value (indicated by the dashed line) is different between the arrangement pitches Pa, Pb, and Pc. In other words, the band of the resonant wavelength varies in accordance with the arrangement pitch of the protruding sections.

Taking the curve O of the reflection characteristic in the resonant grating having the height of the protruding sections of 25 nm and the arrangement pitch of the protruding sections of 500 nm as a reference, the band of the resonant wavelength is shifted toward shorter wavelength side if the arrangement pitch of the protruding sections decreases to 450 nm, while the band of the resonant wavelength is shifted toward longer wavelength side if the arrangement pitch of the protruding sections increases to 550 nm.

Therefore, the resonant grating having the three grid sections with these arrangement pitches Pa, Pb, and Pc mixed with each other becomes to have the reflection characteristic indicated by the solid line A shown in FIG. 6, and is capable of absorbing the reflected light with the frequency in the broader range of wavelength band (2) from shorter wavelengths to longer wavelengths compared to the reflection wavelength band (1) of the resonant grating provided with the grid sections having a single arrangement pitch.

Thus, it is conceivable that the resonant wavelength varies in accordance with the arrangement pitch of the protruding sections of the resonant grating.

When the linearly polarized light TE enters the resonant grating structure according to the present embodiment described above, the evanescent light is generated. The wave number thereof and the wave number of the surface plasmon can be made equal to each other using the evanescent light, and thus the surface plasmon can be excited. Since the energy of the incident light is consumed for the excitation of the surface plasmon, the reflection toward the entering direction of the light can be reduced.

Therefore, it becomes possible to provide the polarization element 1 capable of selectively absorbing unwanted polarized light to thereby be superior in grayscale expression, and realize high-quality image display. Further, since it is not required to provide the absorbing layer, which is provided in the case of Document 1, it becomes, possible to simplify the element structure to thereby achieve cost reduction.

Further, according to this configuration, the thin metal wires 11 and the protruding sections 12 each have a rectangular side-view shape, and are therefore easy to manufacture. Specifically, these constituents can easily be manufactured by forming the metal film on the substrate, and then performing anisotropic etching of the RIE thereon using the resist pattern as a mask. Therefore, it becomes possible to improve the production efficiency to thereby achieve the cost reduction.

Further, although in the present embodiment there is described the structure in which the ratio between the width W1 of each of the thin metal wires 11 and the width W2 of the space between the thin metal wires 11 is set to approximately 1:1, the invention is not limited thereto. For example, the ratio between the width W1 of each of the thin metal wires 11 and the width W2 of the space between the thin metal wires 11 can also be set to be different from each other.

Further, since in the present embodiment, the arrangement pitch of the protruding sections 12 and the recessed sections 13 formed on the thin metal wires 11 is different between the thin metal wires 11 adjacent to each other, the wavelength of the linearly polarized light TE which can be absorbed is different between the thin metal wires 11, and as a result, the wavelength range of the linearly polarized light which can be absorbed is dramatically expanded. Therefore, since the reflectance can be decreased in a broad wavelength range, the design margin thereof increases when applying the polarization element 1 to the projector described later, and the polarization element 1 can be made more user-friendly.

Further, by making the three types of grid sections having the respective arrangement pitches of the protruding sections 12 and the recessed sections 13 different from each other form a group, and arranging it as the grid group G1, the element design becomes easy, and at the same time, manufacturing thereof becomes easy.

Further, although in the present embodiment the example of arranging the protruding sections 12 and the recessed sections 13 alternately on the upper surface 11a of each of the thin metal wires 11 is shown, the invention is not limited thereto. For example, the protruding sections 12 and the recessed sections 13 can also be arranged on at least one surface of each of the thin metal wires 11 such as a side surface of each of the thin metal wires 11. Even in such a configuration, the surface plasmon can be excited.

Further, although in the present embodiment the grid sections 14 are arranged in the order of the length of the protruding sections 12, it is not necessary to arrange them in the order of the length of the protruding sections 12 providing the length of the protruding sections 12 is different between the grid sections 14 adjacent to each other. For example, it is also possible that a plurality of types of grid sections 14 with the respective arrangement pitches of the protruding sections 12 different from each other are arranged irregularly on the substrate 10.

Polarization Element of Second Embodiment

Figure 7A:
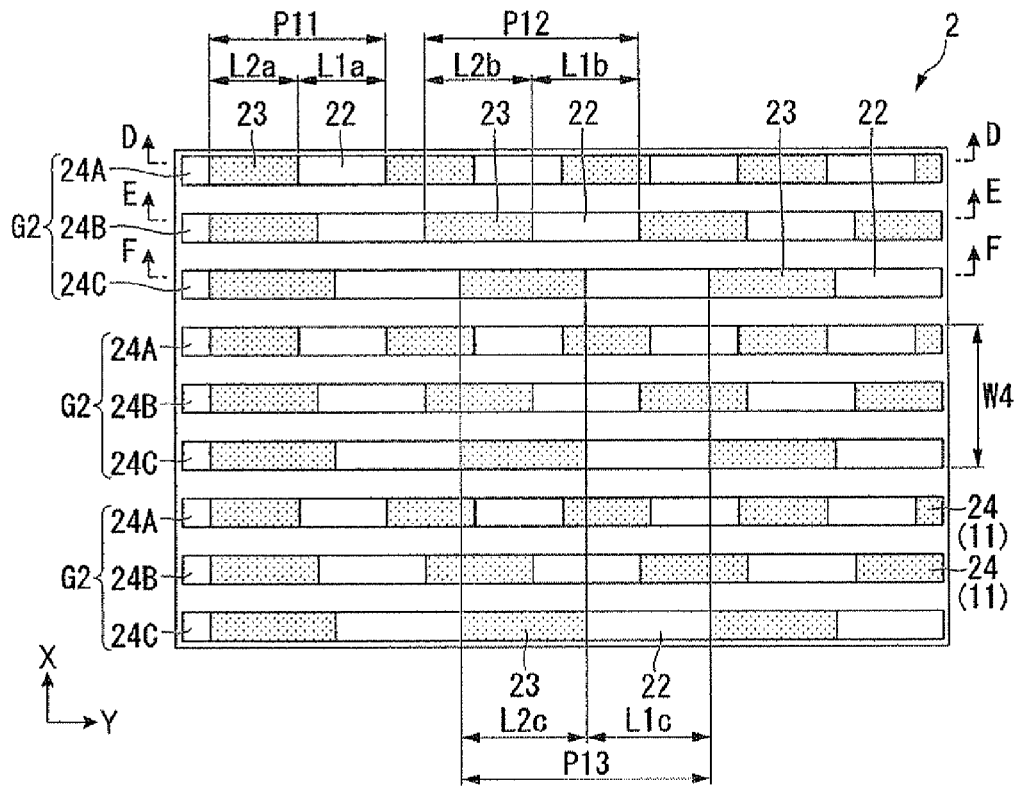
FIG. 7A is a plan view showing a schematic configuration of a polarization element according to a second embodiment.
Figure 7B:
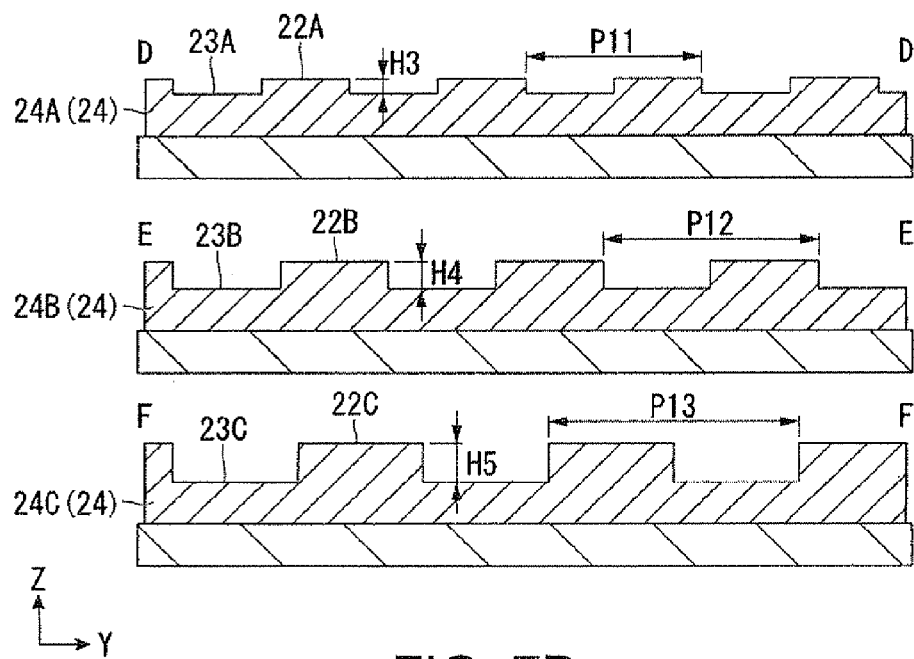
FIG. 7B is a partial cross-sectional view showing a schematic configuration of the polarization element according to the second embodiment.

Then, the polarization element according to a second embodiment will be described. FIG. 7A is a plan view showing a schematic configuration of the polarization element according to the second embodiment, and FIG. 7B is a partial cross-sectional view showing a schematic configuration of the polarization element according to the second embodiment.

Although in the previous embodiment the structure in which the height (the depth of the recessed sections) of the protruding sections is set to a predetermined height (about 25 nm) is described, in the present embodiment, the height H (the depth of the recessed sections 23) of the protruding sections 22 can also be set for each of the grid sections 24 in accordance with the wavelength of the incident light.

As shown in FIG. 7A, the polarization element 2 according to the present embodiment is composed of the substrate 10 (FIG. 1), and a plurality of grid sections 24 arranged on the substrate 10 in a striped manner, and the plurality of grid sections 24 is arranged at a pitch shorter than the wavelength of the incident light.

Similarly to the previous embodiment, a plurality of protruding sections 22 is arranged on each of the thin metal wires 11 constituting the grid section 24 at a predetermined pitch, and the arrangement pitch of the protruding sections 22 (the recessed sections 23) is different between the grid sections 24 adjacent to each other. Here, in the present embodiment, as shown in FIG. 7B, the height (the depth of the recessed sections 23) of the protruding sections 22 is not constant but different between the grid sections 24 adjacent to each other.

In the present embodiment, a grid group G2 is composed of three grid sections 24A, 24B, and 24C having the respective arrangement pitches of the protruding sections 22 and the recessed sections 23 disposed on the thin metal wires 11 different from each other. Specifically, a plurality of protruding sections 22A (recessed sections 23A) disposed on the thin metal wire 11A is arranged at the first pitch 211, a plurality of protruding sections 22B (recessed sections 23B) disposed on the thin metal wire 11B is arranged at the second pitch P12, and a plurality of protruding sections 22C (recessed sections 23C) disposed on the thin metal wire 11C is arranged at the third pitch P13. The specific numerical values of the pitches P11, P12, and P13 are as described in the previous embodiment.

As shown in FIG. 7B, in the present embodiment, the height H3 (the depth of the recessed sections 23) of the protruding sections 22 is different between the grid sections 24 adjacent to each other. The height H3 (the depth of recessed sections 23A) of the protruding sections 22A arranged on the thin metal wire 11A is 20 nm, the height H4 of the protruding sections 22B arranged on the thin metal wire 11B is 25 nm, and the height H5 of the protruding sections 22C arranged on the thin metal wire 11C is 30 nm.

Further, the width W4 of the grid group G2 in the arrangement direction of the grid sections 24A, 24B, and 24C is set to be smaller than the wavelength of the incident light. Further, a space with a width equal to the width W2 (FIG. 1) of the space between the thin metal wires 11 is provided between the grid groups G2 adjacent to each other.

According to the present configuration, the arrangement pitch of the protruding sections 22 formed on the thin metal wire 11 and the protrusion height of the protruding sections 22 with respect to the recessed sections 23 are different between the grid sections 24 adjacent to each other.

By making the height (the depth of the recessed sections 23) of the protruding sections 22 vary in accordance with the wavelength of the incident light, the surface plasmon resonance (SPR) is developed, thereby making it possible to selectively absorb the linearly polarized light TE (the unwanted polarized light) with a specific wavelength entering the polarization element 2, and at the same time expand the range of the wavelength of the polarized light which can be absorbed.

Figure 8:
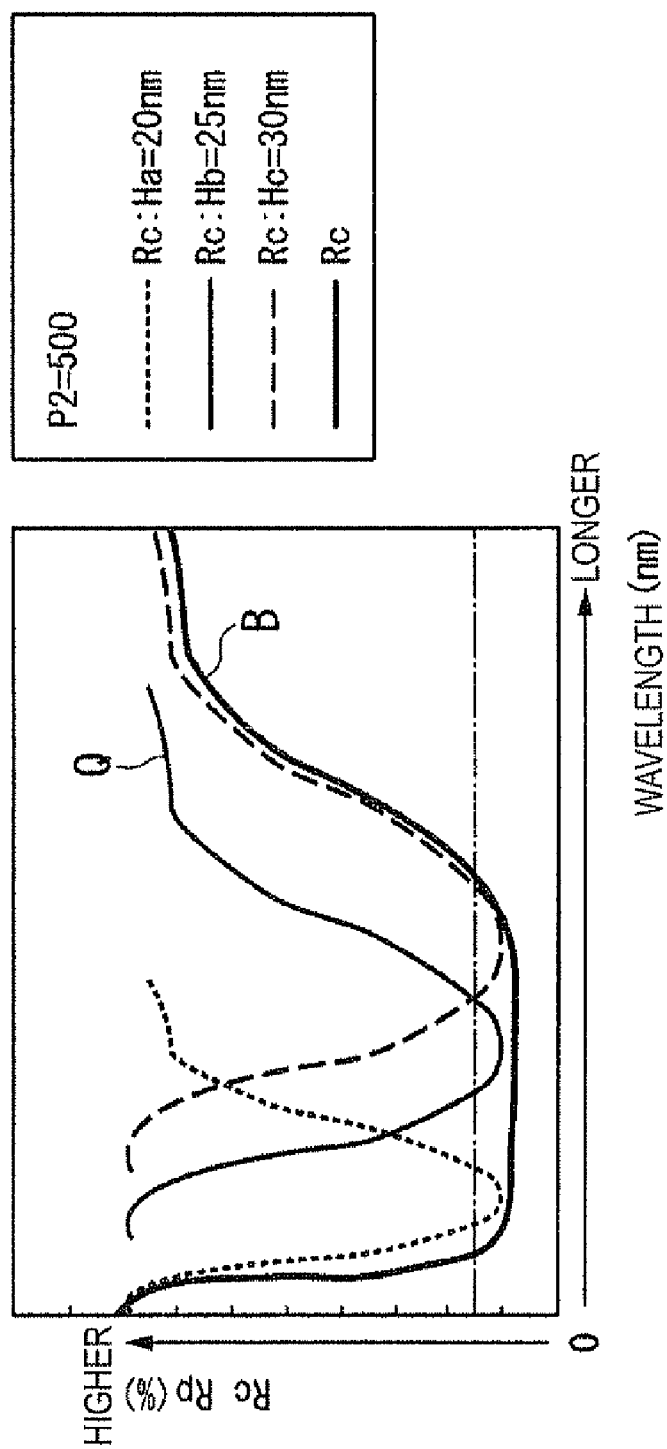
FIG. 8 is a graph showing the reflection characteristic of the second embodiment.

Specifically, the reflectance curve of the polarization element 2 according to the present embodiment becomes to have the shape schematically shown in FIG. 8. FIG. 8 shows the reflection characteristic of the polarization element according to the present embodiment. In the drawing, the lateral axis represents the wavelength of the incident light, and the vertical axis represents the reflectance (Rc) with respect to the TE light.

FIG. 8 shows the reflection characteristics in the three types of resonant grating (the height Ha is 20 nm, the height Hb is 25 nm, and the height Hc is 30 nm) having the arrangement pitch of the protruding sections of the grid sections of the resonant grating of 500 nm, and the respective heights of the protruding sections of the grid sections different from each other.

According to FIG. 8, it is understood that the wavelength band where the reflectance (Rc) to the TE light decreases most significantly is different between the heights Ha. Hb. And Hc of the protruding sections also in the present embodiment. In other words, the band of the resonant wavelength varies in accordance with the protrusion height of the protruding sections.

Taking the curve Q of the reflection characteristic in the resonant grating having the arrangement pitch of the protruding sections of 500 nm and the height of the protruding sections of 25 nm as a reference, the band of the resonant wavelength is shifted toward shorter wavelength side if the height of the protruding sections decreases to 20 nm, while the band of the resonant wavelength is shifted toward longer wavelength side if the height of the protruding sections increases to 30 nm.

Therefore, also in the resonant grating provided with three types of grid sections having the heights of the protruding sections different from each other, it is possible to absorb the reflected light with the frequency in the broader range of wavelength band from shorter wavelengths to longer wavelengths compared to the resonant grating provided with only the grid sections having the height set to be constant.

Thus, it is conceivable that the resonant wavelength varies in accordance with the depth (the height of the protruding sections) of the resonant grating.

Projector

Figure 9:
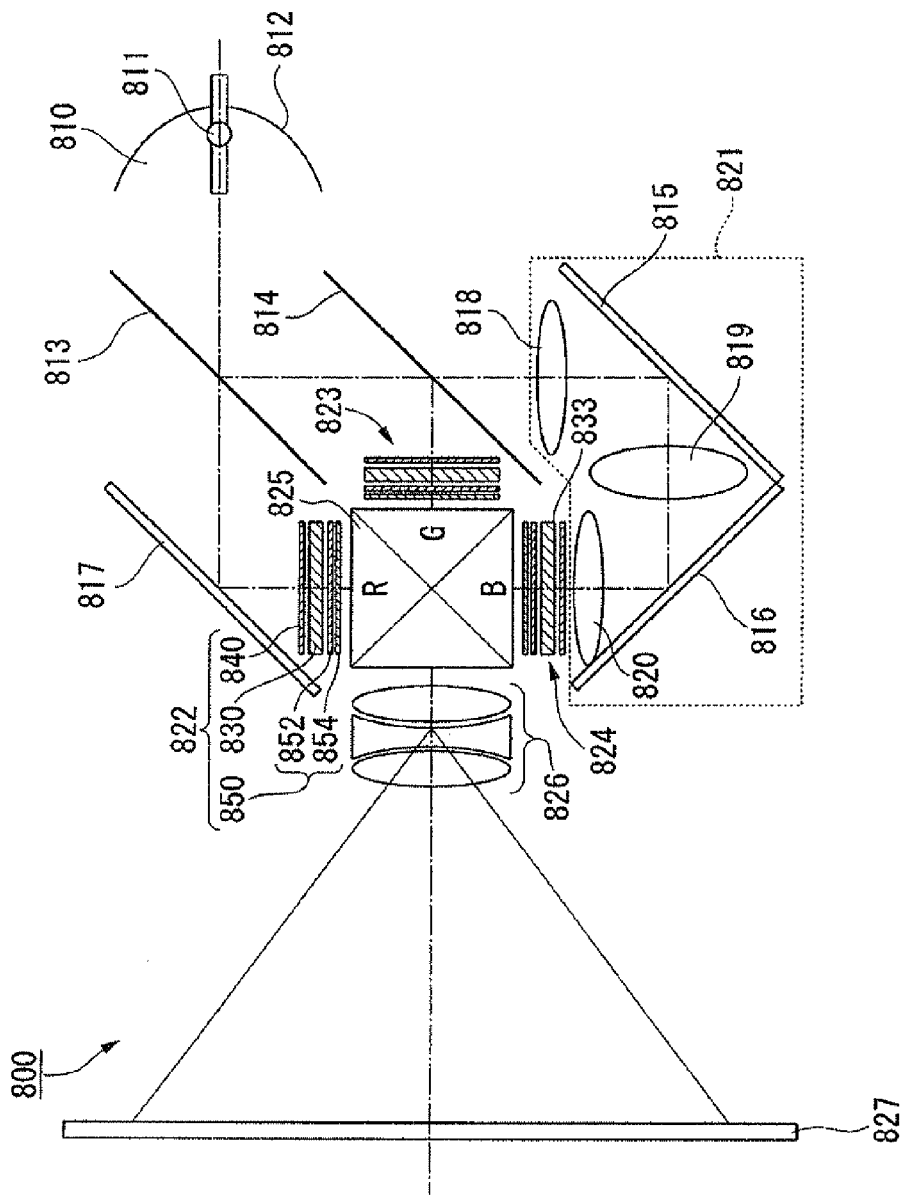
FIG. 9 is a schematic diagram showing an example of a projector.

FIG. 9 is a schematic diagram showing an example of a projector equipped with the polarization element according to the present embodiment of the invention.

As shown in FIG. 9, a projector 800 has a light source 810, dichroic mirrors 813, 814, reflecting mirrors 815, 816, 817, an entrance lens 818, a relay lens 819, an exit lens 820, light modulation sections 822, 823, 824, a cross dichroic prism 825, and a projection lens 826.

The light source 810 is composed of a lamp 811 such as a metal halide lamp, and a reflector 812 for reflecting the light of the lamp. It should be noted that as the light source 810, a super-high pressure mercury lamp, a flash mercury lamp, a high-pressure mercury lamp, a deep UV lamp, a xenon lamp, a xenon flash lamp, and so on can also be used besides the metal halide lamp.

The dichroic mirror 813 transmits red light included in white light emitted from the light source 810, and reflects blue light and green light. The red light thus transmitted is reflected by the reflecting mirror 817, and input to the light modulation section 822 for the red light. Further, the green light out of the blue light and the green light both reflected by the dichroic mirror 813 is reflected by the dichroic mirror 814, and is input to the light modulation section 823 for the green light. The blue light is transmitted through the dichroic mirror 814, and is input to the light modulation section 824 for the blue light via the relay optical system 821 provided for preventing the light loss due to a long light path, and including the entrance lens 818, the relay lens 819, and exit lens 820.

The light modulating sections 822 through 824 each have an entrance side polarization element 840 and an exit side polarization element section 850 disposed on the both sides of a liquid crystal light valve 830 so as to sandwich the liquid crystal light valve 830. The entrance side polarization element 840 and the exit side polarization element section 850 are arranged so as to have the respective transmission axes perpendicular to each other (the cross-Nicol arrangement).

The entrance side polarization element 840 is a reflective type polarization element, and reflects the light having the oscillation direction perpendicular to the transmission axis.

On the other hand, the exit side polarization element section 850 has a first polarization element (a pre-polarization plate, a pre-polarizer) 852, and a second polarization element 854. As the first polarization element 852, there is used the polarization element according to the present embodiment of the invention described above, having high heat resistance. Further, the second polarization element 854 is a polarization element having an organic material as the constituent material. Both of the polarization elements used in the exit side polarization element section 850 are the absorbing type polarization elements, and the polarization elements 852, 854 absorb the light in cooperation with each other.

In general, the absorbing type polarization element formed of an organic material is easily deteriorated by heat, and therefore, hard to be used as a polarization section of a high-power projector requiring high luminance. However, in the projector 800 of the embodiment of the invention, the first polarization element 852 formed of an inorganic material having high heat resistance is disposed between the second polarization element 854 and the liquid crystal light valve 830, and the polarization elements 852, 854 absorb the light in cooperation with each other. Therefore, the deterioration of the second polarization element 854 formed of an organic material can be prevented.

Further, in order for efficiently transmitting the light beams to be modulated by the respective light modulation sections 822 through 824, the first polarization elements 852 have the heights of the protruding sections on the upper surface of the thin metal wires provided to the respective first polarization elements 852 different from each other so as to correspond to the wavelengths of the light beams to be modulated by the respective light modulation sections 822 through 824. Therefore, it is arranged that the light beams can efficiently be used.

The three colored light beams modulated by the respective light modulation sections 822 through 824 are input to the cross dichroic prism 825. The cross dichroic prism 825 is composed of four rectangular prisms bonded to each other, and on the interface therebetween, there are formed a dielectric multilayer film for reflecting the red light and a dielectric multilayer film for reflecting the blue light to have an X shape. The three colored light beams are combined by these dielectric multilayer films to form a light beam for representing a color image. The light beam obtained by combining the three colored light beams is projected on a screen 827 by the projection lens 826 as a projection optical system, thus the image is displayed in an enlarged manner.

Since the projector 800 having such a configuration as described above is arranged to use the polarization element according to the embodiment of the invention described above as the exit side polarization element section 850, even if the high power light source is used, deterioration of the polarization element can be prevented. Therefore, there can be provided the projector 800 superior in grayscale expression, capable of realizing high-quality image display, and achieving cost reduction.

The entire disclose of Japanese Patent Application No.: 2010-034376, filed Feb. 19, 2010 is expressly incorporated by reference herein.

What is claimed is:

1. A polarization element comprising:
   a substrate; and
   a plurality of grid sections arranged on the substrate,
   wherein the grid sections each have protruding sections and recessed sections alternately arranged in a longitudinal direction of the grid sections at a pitch shorter than a wavelength of incident light, and
   an arrangement pitch of the protruding sections is different between the grid sections adjacent to each other.

2. The polarization element according to claim 1, wherein the protruding sections and the recessed sections provided to the same grid section have lengths equal to each other.

3. The polarization element according to claim 1, wherein a plurality of grid groups each having first one of the grid sections having the protruding sections arranged at a first pitch and second one of the grid sections having the protruding sections arranged at a second pitch is disposed on the substrate, and
   a width of the grid group in an arrangement direction of the grid sections is smaller than the wavelength of the incident light.

4. The polarization element according to claim 1, wherein a plurality of types of grid sections having arrangement pitches of the protruding sections different from each other is arranged irregularly on the substrate.

5. The polarization element according to claim 1, wherein a protrusion height of the protruding sections with respect to the recessed sections is different between the grid sections adjacent to each other.

6. The polarization element according to claim 1, wherein the grid sections, the protruding sections, and the recessed sections each have a rectangular shape in a side view.

7. A projector comprising:
   a lighting optical system adapted to emit a light beam;
   at least one liquid crystal light valve adapted to modulate the light beam;
   at least one polarization element according to claim 1, to which the light beam modulated by the liquid crystal light valve is input; and
   a projection optical system adapted to project a polarized light beam, which is transmitted through the polarization element, to a projection surface.

* * * * *